United States Patent Office 3,840,650
Patented Oct. 8, 1974

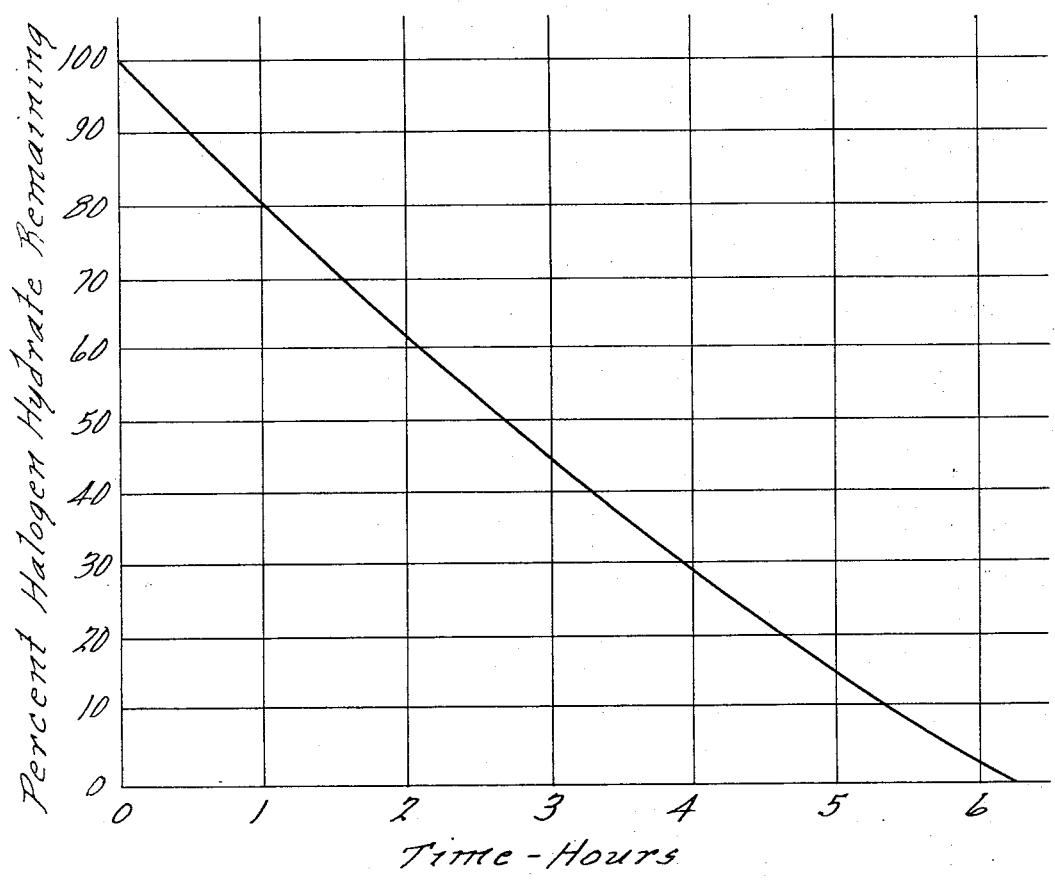

3,840,650
STABLE CHLORINE HYDRATE
Harry K. Bjorkman and Philip C. Symons, Birmingham, Mich., assignors to Energy Development Associates, Madison Heights, Mich.
Filed Mar. 20, 1972, Ser. No. 235,981
Int. Cl. C01b 7/02
U.S. Cl. 423—462                    10 Claims

ABSTRACT OF THE DISCLOSURE

A process for producing chlorine hydrate of improved stability to thermal decomposition comprising the steps of:

1. passing chlorine into an aqueous solution;
2. forming chlorine hydrate from the solution; and
3. compressing the chlorine hydrate in a vessel to a pressure of at least 1000 p.s.i.

BACKGROUND OF THE INVENTION

The invention relates to a high energy density battery, that is, one which can produce at least 50 watt hours per pound. Any improvement in the material weight that goes into such a battery is desirable. A breakthrough in high energy density batteries is described in U.S. patent application SN. 50,054, filed June 26, 1970 now U.S. Pat. No. 3,713,888 which is hereby incorporated by reference. In that application is described a novel halogen hydrate battery wherein an aqueous metal halide electrolyte is employed. The high energy density battery systems are readily employed as means for supplying power to electrical vehicles. Accordingly, therefore, the smaller the volume of materials that make up the battery that is used the more space that is available for designing the vehicle itself. Reduction in volume of battery components can also be utilized in the refuelable electrical energy storage device described in U.S. SN. 200,070, filed Nov. 18, 1971.

It is an object of the present invention to describe more compact materials that may be employed in halogen hydrate batteries.

It is a further object of the present invention to describe a more stabilized chlorine hydrate.

SUMMARY OF THE INVENTION

The present invention is directed to a new stable form of chlorine hydrate which is yellowish in color and which is prepared by passing chlorine through an aqueous solution and then compressing the chlorine hydrate.

The drawing shows the thermal decomposition rate of compressed chlorine hydrate with time.

DESCRIPTION OF PREFERRED EMBODIMENTS

A more stable chlorine hydrate is desired for use as a means of storing chlorine in high energy density battery. Chlorine hydrate is a convenient means of storing chlorine for it contains more than 100 times the amount of chlorine in a unit volume than gaseous chlorine.

The chlorine hydrate of the present invention may be prepared from any aqueous solution. It can be prepared outside of an electrical energy device and placed in the storage compartment such as that described in U.S. SN. 200,070, filed Nov. 18, 1971. It can also be prepared from an aqueous metal chloride electrolyte such as that described in U.S. SN. 50,054, filed June 26, 1970 now U.S. Pat. 3,713,888 which is hereby incorporated by reference. One way of using the electrolyte is in an electrically rechargeable system.

The chlorine hydrate of the present invention can be prepared by;

1. passing chlorine into an aqueous solution;
2. forming chlorine hydrate; and
3. compressing the chlorine hydrate in a vessel at a pressure of at least 1000 p.s.i.

The chlorine hydrate may also be centrifuged at pressure of about 100 to about 10,000 G's, prior to the compression step to eliminate excess water. The lower the "G" rate, the longer it will take to eliminate the excess water. A preferred "G" rate ranges from about 600 to 2000 "G's."

Chlorine hydrate is generally believed to have the formula $Cl_2 \cdot 8H_2O$. The excess water eliminated, as described above is generally that which is not chemically combined with the chlorine.

The aqueous solution used to prepare the chlorine hydrate may be comprised of a water soluble metal chloride solution wherein the metals that may be employed are iron, cobalt, nickel, zinc or other Group VIII or Group IIb metals of the Periodic Table listed in the Handbook of Chemistry and Physics, 51st edition, page B–3. Other metal chlorides that may be employed are the chlorides of the lanthanide and actinide series as well as the chlorides of lithium, sodium, potassium, rubidium, cessium, Sc, Ti, V, Cr, Mn, Cu, Ga, Y, Zn, Nb, Mo, Tc, Ru, Rh, Pd, Ag, Cd, In, Sn, Hf, Ta, W, Re, Os, In, Pt, Au, Hg, Tl, Pb, Bi or mixtures thereof. The most preferred metal is zinc while of the remaining metals: iron, cobalt and nickel are preferred.

The concentration of the metal halide employed would be such that halogen hydrate can be formed therein, preferably 0.1% to about 45%. The concentration should not be so high that chlorine hydrate cannot be formed.

The temperature of the aqueous solution during hydrate formation may range from about $-25°$ C. to about $9°$ C., the decomposition point for chlorine hydrate, preferably below $9°$ C., and even more preferably at a point above the formation of solid water (ice). For example, when water is used as the aqueous medium, the preferred temperature of the medium will range from about $0°$ C. to $9°$ C., preferably about $5°$ C. When zinc chloride is used as the aqueous solution, the preferred chlorine hydrate formation temperature for the solution is about 2–$4°$ C. with a 10% by weight concentration; $-4°$ C. with a 20% by weight concentration and about $-20°$ C. with a 35% by weight concentration. Clearly as the concentration increases, the aqueous solution must be cooled to achieve a satisfactory temperature for forming chlorine hydrate. There has also been a tendency when using zinc chloride for the solution to decompose the chlorine hydrate at some temperature below $9°$ C., when the hydrate is in the solution. When the chlorine hydrate is separated from the zinc chloride solution, it has a thermal decomposition point of $9°$ C. where chlorine and water are the decomposition products.

When compressing or squeezing the chlorine hydrate in a vessel, regardless of the method of formation, the pressure should be at least 1000 p.s.i., preferably about 1200 to about 10,000 p.s.i. and even more preferably from about 1200 to 2000 p.s.i. The purpose of compressing the chlorine hydrate is to compact it so that it can be used in as small a volume as possible.

When the pressure is less than about 900 p.s.i. the apparent density is less than 1. This density is increased as follows; at a pressure of 1000, the density is 1.1–1.15; at 1200 p.s.i., the density is 1.1–1.2 and at 10,000 p.s.i., the density is 1.21–1.22. From an economic point of view, very little improvement in compactness is achieved at a p.s.i. greater than about 1200.

The pressure of the aqueous solution for forming the chlorine hydrate is preferably atmospheric although pressures above and below atmospheric may be used. See FIG. 2 of U.S. SN. 50,054 for appropriate temperature and pressures that may be used for the formation of chlorine hydrate. It has been found that when somewhat higher pressures than atmospheric are used that a more chlorine rich solution can be obtained thereby resulting in somewhat higher amounts of chlorine in chlorine hydrate. Without being bound to any theory, it may be found that some chlorine hydrate of the formula $Cl_2 \cdot 6H_2O$ may have been formed.

After compressing the hydrate, it may be divided into any appropriate shape desired depending on the storage compartment dimensions. The chlorine hydrate may be pelletized, cut into clips, and the like. The size and type of shape that the chlorine hydrate takes will have a great deal of effect on the time it takes to thermally decompose to chlorine and water for the decomposition rate is surface area dependent.

EXAMPLE 1

Chlorine gas is diffused through a water maintained between 0° and 9°C. until the solution becomes opaque and viscous. The hydrate is centrifuged in a filter centrifuged allowing the liquid which will pass through the filter to drain fully. The acceleration applied to the centrifuge is 12,000 meters per square second. The resulting filter cake is a material containing about 33% by weight chlorine and 67% by weight water. The apparent bulk density is between 0.5 and 0.6 and the color is greenish yellow. This material is then pressed to produce a higher density hydrate. The initial chlorine density is 33% by weight and which is not altered by pressure. Pressures of 12,000 lbs. per square inch give a density of 1.23 grams per cc.

EXAMPLE 2

Chlorine gas is bubbled through a water solution maintained at 0° to 9° C. and following the procedure described above is filtered. The filtered chlorine hydrate is centrifuged at 1500 G's, for 40 seconds and is inserted into a cylinder and compressed with a plunger at a pressure of 1700 p.s.i. The resulting compressed chlorine hydrate contained 31% chlorine, weighed 34.3 gm. had a diameter of 4.86 cm. and a thickness of 1.6 cm. giving a surface area of about 61 cm.$^2$.

The solid chlorine hydrate was placed on screen so that the water may drip away from the hydrate and allow to decompose at atmospheric temperature (about 23° C.) and pressure. The drawing shows the length of time it takes for total decomposition to chlorine and water. The drawing shows that about 50 to about 60% of the chlorine hydrate decomposes in about 2½ hours to about 3½ hours.

What is claimed is:

1. A process for producing a compressed chlorine hydrate of improved stability to thermal decomposition comprising the steps of:
   1. passing chlorine into an aqueous solution;
   2. forming chlorine hydrate in the solution;
   3. filter centrifuging the mixture of chlorine hydrate in the aqueous solution, wherein the rate of centrifuging ranges from 100 to about 10,000 G's; and
   4. compressing the resultant chlorine hydrate filter cake in a vessel to a pressure of at least 1,000 p.s.i.

2. The process of Claim 1, wherein the centrifuging rate ranges from about 600 to 2,000 G's.

3. The process of Claim 1 wherein the pressure used in Step #4 ranges from about 1,200 to about 2,000 lbs. per square inch.

4. The process of Claim 1, wherein the chlorine hydrate is compressed until the chlorine hydrate contains at least 31% chlorine and has an apparent density of at least 1.2.

5. The process of Claim 4, wherein the chlorine hydrate is compressed until the chlorine hydrate will decompose at atmospheric pressure and about 23° C. at a rate such that 50 to about 60% will decompose within a period of time from about 2.5 hours to about 3.5 hours when the surface area of the chlorine hydrate prior to decomposition is about 61 cm.$^2$.

6. A composition of matter produced according to claim 5, hydrate reasonably stable to thermal decomposition to chlorine and water at atmospheric pressure and about 23° C. such that about 50 to about 60% of the chlorine hydrate will decompose within a period of time from about 2.5 hours to about 3.5 hours when the surface area of the chlorine hydrate prior to decomposition is about 61 cm.$^2$, wherein the compressed chlorine hydrate has an apparent density of at least about 1.2 and contains at least about 31% chlorine.

7. The process of Claim 1 wherein the aqueous solution is a Group IIb metal chloride solution.

8. The process of Claim 1 wherein the solution is a Group VIII metal chloride solution.

9. The process of Claim 7 wherein the solution is a zinc chloride solution.

10. The process of Claim 1 comprising compressing up to 10,000 p.s.i.

References Cited

UNITED STATES PATENTS

| 691,058 | 1/1902 | Jaubert | 252—187 XR |

FOREIGN PATENTS

| 607,971 | 11/1960 | Canada | 252—187 |
| 21,151 | 7/1970 | Japan | 252—187 |

OTHER REFERENCES

J. W. Mellor's "A Comprehensive Treatise on Inorganic and Theoretical Chemistry", Vol. 2, 1922 Ed., pages 72, 73, 76 and 82. Longman, Green & Co., New York, N.Y. Copy in Scient. Lib.

F. Ephraim "Inorganic Chemistry," 1943 Ed., page 403. Nordeman Pub. Co., Inc., New York, N.Y. Copy in Scientific Lib.

EDWARD STERN, Primary Examiner

U.S. Cl. X.R.

423—472, 500; 252—187 R; 264—333